United States Patent [19]
Aida et al.

[11] Patent Number: 5,556,821
[45] Date of Patent: Sep. 17, 1996

[54] CATALYST COMPONENT FOR THE POLYMERIZATION OF OLEFINS

[75] Inventors: Fuyuki Aida, Tokyo; Yoshio Tajima; Kazuo Matsuura, both of Yokohama, all of Japan

[73] Assignee: Nippon Oil Company, Limited, Tokyo, Japan

[21] Appl. No.: 276,898

[22] Filed: Jul. 19, 1994

[30] Foreign Application Priority Data

Jul. 22, 1993 [JP] Japan ................................. 5-224893

[51] Int. Cl.$^6$ ..................................... B01J 31/00
[52] U.S. Cl. .................... 502/113; 502/114; 502/132; 502/152
[58] Field of Search ..................... 502/113, 114, 502/132, 152

[56] References Cited

U.S. PATENT DOCUMENTS

| | | | |
|---|---|---|---|
| 3,334,079 | 8/1967 | Raich | 260/93.7 |
| 4,871,704 | 10/1989 | Kohara et al. | 502/114 |
| 5,057,475 | 10/1991 | Canich et al. | 502/114 X |
| 5,252,529 | 10/1993 | Ueda et al. | 502/113 |

FOREIGN PATENT DOCUMENTS

| | | |
|---|---|---|
| 58-19309 | 2/1983 | Japan . |
| 60-130604 | 7/1985 | Japan . |
| 60-260602 | 12/1985 | Japan . |
| 63-234005 | 9/1988 | Japan . |

*Primary Examiner*—Michael Lusignan
*Attorney, Agent, or Firm*—Dilworth & Barrese

[57] ABSTRACT

According to the present invention there is provide a catalyst capable of affording an olefin homopolymer or copolymer having a high molecular weight and a relatively wide molecular weight distribution, in high yield, using an extremely small amount of a modified organoaluminum compound (particularly methylaluminoxane).

The catalyst comprises the modified organoaluminum compound and a catalyst component comprising the following compounds (1) and (2): (1) a compound represented by the general formula $R_pMX_{4-p}$, where M is a transition metal of Group IVa in the Periodic Table, R is cyclopentadienyl, substituted cyclopentadienyl, indenyl, substituted indenyl, or an aralkyl group having 7 to 24 carbon atoms, provided Rs may be bonded together through an alkylene groups having 2 to 8 carbon atoms and/or silylene group, X is a halogen atom, a hydrogen atom or a hydrocarbon residue having 1 to 24 carbon atoms, and p is a number satisfying the condition of $1 \leq p \leq 4$; and (2) a compound containing carbon-fluorine bond.

13 Claims, No Drawings

CATALYST COMPONENT FOR THE POLYMERIZATION OF OLEFINS

BACKGROUND OF THE INVENTION

The present invention relates to a catalyst component for use in the polymerization or copolymerization of olefins. This catalyst component is high in catalytic efficiency, contains only a small amount of a modified organoaluminum compound, affords a polymer having a high molecular weight and a relatively wide molecular weight distribution, and permits easy control of the molecular weight and molecular weight distribution. The present invention is further concerned with a catalyst using the said catalyst component and an olefin polymer preparing process using such catalyst. The olefin polymer as referred to herein is a generic term for both homopolymer and copolymer of olefins.

As means for obtaining such an ethylenic polymer as polyethylene or ethylene/α-olefin copolymer having a narrow molecular weight distribution and a narrow composition distribution there recently has been proposed the use of a catalyst comprising a zirconium compound and an aluminoxane (JP58-19309A).

According to a process using such proposed catalyst there is obtained an ethylene copolymer in high yield which copolymer is narrow in both molecular weight distribution and composition distribution. However, the molecular weight of the copolymer is low and the amount of the aluminoxane used is large.

JP3-234005A proposes the use of a transition metal compound having a 2, 3 or 4-substituted cyclopentadienyl group to improve the molecular weight of the resulting polymer. In JP2-22307A it is proposed to use a hafnium compound having a ligand bonded to at least two crosslinked conjugated cycloalkadienyl groups for improving the molecular weight of the resulting polymer.

However, the use of hafnium as a transition metal is disadvantageous in that the yield of the resulting polymer is low.

It is the object of the present invention to provide a catalyst and process for preparing an olefin homopolymer or copolymer having a high molecular weight and a relatively wide molecular weight distribution in high yield using an extremely small amount of a modified organoaluminum compound (particularly methylaluminoxane).

SUMMARY OF THE INVENTION

The present invention relates to a catalyst component for the polymerization of olefins, comprising:

(1) a compound represented by the general formula $R_pMX_{4-p}$ where M is a transition metal of Group IVa in the Periodic Table, R is cyclopentadienyl, substituted cyclopentadienyl, indenyl, substituted indenyl, or an aralkyl group having 7 to 24 carbon atoms, provided R may be bonded together through an alkylene group of $C_2$ to $C_8$ and/or a silylene group, X is a halogen atom, a hydrogen atom or a hydrocarbon residue having 1 to 24 carbon atoms, and p is a number satisfying the condition of $1 \leq p \leq 4$; and (2) a compound containing carbon-fluorine bond.

The present invention is also concerned with an olefin polymerizing catalyst containing the above catalyst component and a modified organoaluminum compound having Al—O—Al bond obtained by the reaction of an organoaluminum compound and water.

The present invention is further concerned with an olefin homopolymer or copolymer preparing process characterized by homopolymerizing or copolymerizing an olefin or olefins in the presence of a catalyst containing the above catalyst component and a modified organoaluminum compound having Al—O—Al bond obtained by the reaction of an organoaluminum compound and water.

The olefin polymerizing catalyst according to the present invention is high in its activity per transition metal and can maintain a high activity even in the case where the amount of a modified organoaluminum compound (particularly aluminoxane) is extremely small. Besides, the resulting olefin homopolymer or copolymer is high in molecular weight and relatively wide in molecular weight distribution.

DETAILED DESCRIPTION OF THE INVENTION

The present invention will be described in detail hereinunder.

Reference will first be made to the compound of the general formula $R_pMX_{4-p}$ used in the present invention. In this formula, M is a transition metal of Group IVa in the Periodic Table, preferably Ti, Zr or Hf, more preferably Ti, R is cyclopentadienyl, substituted cyclopentadienyl, indenyl, substituted indenyl or an aralkyl group having 7 to 24, preferably 7 to 13, carbon atoms, provide R may be bonded together through an alkylene group of $C_2$ to $C_8$, preferably $C_2$ to $C_4$, and/or silylene, X is a halogen atom such as chlorine, bromine or fluorine, a hydrogen atom or a hydrocarbon radical having 1 to 24, preferably 1 to 12, carbon atoms, and p is a number satisfying the condition of $1 \leq p \leq 4$.

More specifically, in connection with R in the above formula, as preferred examples of the substituent group in the substituted cyclopentadienyl and substituted indenyl there are mentioned alkyl groups of $C_1$ to $C_6$ such as methyl, ethyl, propyl, butyl, pentyl and hexyl, as well as their branched groups and a hydrogen atom. Examples of the aralkyl group include benzyl, phenethyl, benzhydryl, trityl, phenylbutyl and phenylpropyl.

In the case where R are bonded together through an alkylene group and/or a silylene group, a hydrogen group in R becomes one free valence and R can become a divalent group.

In the case where an alkylene group which links R together is present and when R is cyclopentadienyl, substituted cyclopentadienyl, indenyl or substituted indenyl, the alkylene group usually links such rings.

In the case where a silylene group which links Rs together is present, examples of such silylene group include silylene, dimethylsilylene, phenylmethylsilylene, diphenylsilylene, disilylene and tetramethylsilylene. When R is cyclopentadienyl, substituted cyclopentadienyl, indenyl or substituted indenyl, the silylene group usually links such rings together.

As preferred examples of the hydrocarbon residue of X there are mentioned alkyl groups such as methyl, ethyl, propyl, isopropyl, cyclopropyl, butyl, isobutyl, tert-butyl, cyclobutyl, pentyl, isopentyl, neopentyl, cyclopentyl, hexyl, isohexyl, cyclohexyl, heptyl and octyl, alkenyl groups such as vinyl and allyl, aryl groups such as phenyl, tolyl, xylyl, mesityl, indenyl and naphthyl, aralkyl groups such as benzyl, trityl, phenethyl, styryl, benzhydryl, trityl, phenylbutyl and phenylpropyl, alkoxy groups such as methoxy, ethoxy, propoxy, butoxy and pentyloxy, aryloxy groups such as phenoxy and tolyloxy, and aralkyloxy such as benzyloxy. In the case of $1 \leq p \leq 2$, X may be the same or different.

Examples of the compound represented by the general formula $R_pMX_{4-p}$ include cyclopentadienyl trimethyl titanium, cyclopentadienyl triethyl titanium, cyclopentadienyl tripropyl titanium, cyclopentadienyl tributyl titanium, methylcyclopentadienyl trimethyl titanium, 1,2-dimethylcyclopentadienyl trimethyl titanium, 1,2,4-trimethylcyclopentadienyl trimethyl titanium, pentamethylcyclopentadienyl trimethyl titanium, pentamethylcyclopentadienyl triethyl titanium, pentamethylcyclopentadienyl tripropyl titanium, pentamethylcyclopentadienyl tributyl titanium, cyclopentadienyl methyl titanium dichloride, cyclopentadienyl ethyl titanium dichloride, pentamethylcyclopentadienyl methyl titanium dichloride, pentamethylcyclopentadienyl ethyl titanium dichloride, cyclopentadienyl dimethyl titanium monochloride, cyclopentadienyl diethyl titanium dichloride, cyclopentadienyl titanium trimethoxide, cyclopentadienyl titanium tripropoxide, cyclopentadienyl titanium triphenoxide, pentamethylcyclopentadienyl titanium trimethoxide, pentamethylcyclopentadienyl titanium triethoxide, pentamethylcyclopentadienyl titanium tripropoxide, pentamethylcyclopentadienyl titanium tributoxide, pentamethylcyclopentadienyl titanium triphenoxide, cyclopentadienyl titanium trichloride, pentamethylcyclopentadienyl titanium trichloride, cyclopentadienyl methoxy titanium dichloride, cyclopentadienyl dimethoxy titanium chloride, pentamethylcyclopentadienyl trimethoxy titanium dichloride, cyclopentadienyl benzyl titanium, pentamethylcyclopentadienyl methyl diethoxy titanium, indenyl titanium trichloride, indenyl titanium trimethoxide, indenyl titanium triethoxide, indenyl trimethyl titanium, indenyl tribenzyl titanium, cyclopentadienyl trimethyl zirconium, cyclopentadienyl triethyl zirconium, cyclopentadienyl tripropyl zirconium, cyclopentadienyl tributyl zirconium, methylcyclopentadienyl trimethyl zirconium, 1,2-dimethylcyclopentadienyl trimethyl zirconium, 1,2,4-trimethylcyclopentadienyl trimethyl zirconium, pentamethylcyclopentadienyl trimethyl zirconium, pentamethylcyclopentadienyl triethyl zirconium, pentamethylcyclopentadienyl tripropyl zirconium, pentamethylcyclopentadienyl tributyl zirconium, cyclopentadienyl methyl zirconium dichloride, cyclopentadienyl ethyl zirconium dichloride, pentamethylcyclopentadienyl methyl zirconium dichloride, pentamethylcyclopentadienyl ethyl zirconium dichloride, cyclopentadienyl dimethyl zirconium monochloride, cyclopentadienyl diethyl zirconium dichloride, cyclopentadienyl zirconium trimethoxide, cyclopentadienyl zirconium triethoxide, cyclopentadienyl zirconium tripropoxide, cyclopentadienyl zirconium triphenoxide, pentamethylcyclopentadienyl zirconium trimethoxide, pentamethylcyclopentadienyl zirconium triethoxide, pentamethylcyclopentadienyl zirconium tripropoxide, pentamethylcyclopentadienyl zirconium tributoxide, pentamethylcyclopentadienyl zirconium triphenoxide, cyclopentadienyl zirconium trichloride pentamethylcyclopentadienyl zirconium trichloride, cyclopentadienyl methoxy zirconium dichloride, cyclopentadienyl dimethoxy zirconium chloride, pentamethylcyclopentadienyl trimethoxy zirconium dichloride, cyclopentadienyl benzyl zirconium, pentamethylcyclopentadienyl methyl diethoxy zirconium, indenyl zirconium trichloride, indenyl zirconium trimethoxide, indenyl zirconium triethoxide, indenyl trimethyl zirconium, indenyl tribenzyl zirconium, cyclopentadienyl trimethyl hafnium, cyclopentadienyl triethyl hafnium, cyclopentadienyl tripropyl hafnium, cyclopentadienyl tributyl hafnium, methylcyclopentadienyl trimethyl hafnium, 1,2-dimethylcyclopentadienyl trimethyl hafnium, 1,2,4-trimethylcyclopentadienyl trimethyl hafnium, pentamethylcyclopentadienyl trimethyl hafnium, pentamethylcyclopentadienyl triethyl hafnium, pentamethylcyclopentadienyl tripropyl hafnium, pentamethylcyclopentadienyl tributyl hafnium, cyclopentadienyl methyl hafnium dichloride, cyclopentadienyl ethyl hafnium dichloride, pentamethylcyclopentadienyl methyl hafnium dichloride, pentamethylcyclopentadienyl ethyl hafnium dichloride, cyclopentadienyl dimethyl hafnium monochloride, cyclopentadienyl diethyl hafnium dichloride, cyclopentadienyl hafnium trimethoxide, cyclopentadienyl hafnium triethoxide, cyclopentadienyl hafnium tripropoxide, cyclopentadienyl hafnium triphenoxide, pentamethylcyclopentadienyl hafnium trimethoxide, pentamethylcyclopentadienyl hafnium triethoxide, pentamethylcyclopentadienyl hafnium tripropoxide, pentamethylcyclopentadienyl hafnium tributoxide, pentamethylcyclopentadienyl hafnium triphenoxide, cyclopentadienyl hafnium trichloride pentamethylcyclopentadienyl hafnium trichloride, cyclopentadienyl methoxy hafnium dichloride, cyclopentadienyl dimethoxy hafnium chloride, pentamethylcyclopentadienyl trimethoxy hafnium dichloride, cyclopentadienyl benzyl hafnium, pentamethylcyclopentadienyl methyl diethoxy hafnium, indenyl hafnium trichloride, indenyl hafnium trimethoxide, indenyl hafnium triethoxide, indenyl trimethyl hafnium, indenyl tribenzyl hafnium, bis(cyclopentadienyl) dichloro titanium, bis(cyclopentadienyl) methyl chloro titanium, bis(cyclopentadienyl) dimethyl titanium, bis(cyclopentadienyl) ethoxy chloro titanium, bis(cyclopentadienyl) propoxy chloro titanium, bis(cyclopentadienyl) phenoxy chloro titanium, bis(cyclopentadienyl) propyl chloro titanium, bis(cyclopentadienyl) diphenyl titanium, bis(cyclopentadienyl) ditolyl titanium, bis(cyclopentadienyl) titanium benzyl, bis(cyclopentadienyl) titanium monochloromonohydride, bis(methylcyclopentadienyl) dimethyl titanium, tetracyclopentadienyl titanium, bis(indenyl)dichloro titanium, bis(indenyl)dimethyl titanium, ethylene bis(indenyl) titanium dichloride, ethylene bis(tetrahydroindenyl) titanium dichloride, tetraneopentyl titanium, tetraneophyl titanium, tetrabenzyl titanium, bis(cyclopentadienyl) dichloro zirconium, bis(cyclopentadienyl) methyl chloro zirconium, bis(cyclopentadienyl) dimethyl zirconium, bis(indenyl) dimethyl zirconium, bis(indenyl) dichloro zirconium, ethylene bis(indenyl) dichloro zirconium ethylene bis(tetrahydroindenyl) dichloro zirconium, bis(methylcyclopentadienyl) dimethyl zirconium, bis(cyclopentadienyl) zirconium, monochloro monohydride, bis(cyclopentadienyl) zirconium dibenzyl, tetracyclopentadienyl zirconium, tetrabenzyl zirconium, bis(cyclopentadienyl) ethoxy chloro zirconium, bis(cyclopentadienyl) propoxy chloro zirconium, bis(cyclopentadienyl) phenoxy chloro zirconium, bis(cyclopentadienyl) propyl chloro zirconium, bis(cyclopentadienyl) diphenyl zirconium, bis(cyclopentadienyl) ditolyl zirconium, bis(cyclopentadienyl) monomethyl monohydride zirconium, bis(cyclopentadienyl) monoethyl monochloro zirconium, bis(cyclopentadienyl) monophenyl monochloro zirconium, tetraneopentyl zirconium, tetraneophyl zirconium, bis(cyclopentadienyl) dichloro hafnium, bis(cyclopentadienyl) methyl chloro hafnium, bis(cyclopentadienyl) dimethyl hafnium, bis(cyclopentadienyl) ethoxy chloro hafnium, bis(cyclopentadienyl) propoxy chloro hafnium, bis(cyclopentadienyl) phenoxy chloro hafnium, bis(cyclopentadienyl) propyl chloro hafnium, bis(cyclopentadienyl) diphenyl hafnium, bis(cyclopentadienyl) ditolyl hafnium, bis(cyclopentadienyl) monomethyl monohydride hafnium, bis(cyclopentadienyl) dibenzyl hafnium, ethylene bis(indenyl) dichloride hafnium, ethylene bis(tetrahydroindenyl) dichloro hafnium, tetraneopentyl hafnium, tetraneophyl hafnium and the like. Preferred are bis(cyclopentadienyl) dichloro titanium, bis(cyclopentadienyl) dimethyl titanium, bis(cyclopentadienyl) dichloro zirconium, bis(cyclopentadienyl) dimethyl zirconium, bis(cyclopentadienyl) dimethyl hafnium, silyl biscyclopentadienyl titanium chloride, silyl biscyclopentadienyl titanium bromide, silyl biscyclopentadienyl titanium dimethyl, silyl biscyclopentadienyl titanium diethyl, silyl biscyclopentadienyl titanium diphenyl, silyl bismethylcyclopentadienyl titanium chloride, silyl bismethylcyclopentadienyl titanium bromide, silyl bismethylcyclopentadienyl titanium dimethyl, silyl bismethylcyclopentadienyl titanium diethyl, silyl bismethylcyclopentadienyl titanium diphenyl, dimethylsilyl biscyclopentadienyl titanium chloride, dimethylsilyl biscyclopentadienyl titanium bromide, dimethylsilyl biscyclopentadienyl titanium dimethyl, dimethylsilyl biscyclopentadienyl titanium diethyl, dimethylsilyl biscyclopentadienyl titanium diphenyl, dimethylsilyl biscyclopentadienyl titanium chloride, dimethylsilyl bismethylcyclopentadienyl titanium bromide, dimethylsilyl bismethylcyclopentadienyl titanium dimethyl, dimethylsilyl bismethylcyclopentadienyl titanium diethyl, dimethylsilyl bismethylcyclopentadienyl titanium diphenyl, phenylmethylsilyl biscyclopentadienyl titanium bromide, phenylmethylsilyl biscyclopentadienyl titanium dimethyl, phenylmethylsilyl biscyclopentadienyl titanium diethyl, phenylmethylsilyl biscyclopentadienyl titanium diphenyl, phenylmethylsilyl bismethylcyclopentadienyl titanium chloride, phenylmethylsilyl bismethylcyclopentadienyl titanium bromide, phenylmethylsilyl bismethylcyclopentadienyl titanium dimethyl, phenylmethylsilyl bismethylcyclopentadienyl titanium diethyl, phenylmethylsilyl bismethylcyclopentadienyl titanium diphenyl, diphenylsilyl biscyclopentadienyl titanium dichloride, diphenylsilyl biscyclopentadienyl titanium bromide, diphenylsilyl biscyclopentadienyl titanium dimethyl, diphenylsilyl biscyclopentadienyl titanium diethyl, diphenylsilyl biscyclopentadienyl titanium diphenyl, diphenylsilyl bismethylcyclopentadienyl titanium chloride, diphenylsilyl bismethylcyclopentadienyl titanium bromide, diphenylsilyl bismethylcyclopentadienyl titanium dimethyl, diphenylsilyl bismethylcyclopentadienyl titanium diethyl, diphenylsilyl bismethylcyclopentadienyl titanium diphenyl, disilyl biscyclopentadienyl titanium chloride, disilyl biscyclopentadienyl titanium bromide, disilyl biscyclopentadienyl titanium dimethyl, disilyl biscyclopentadienyl titanium diethyl, disilyl biscyclopentadienyl titanium diphenyl, disilyl bismethylcyclopentadienyl titanium chloride, disilyl bismethylcyclopentadienyl titanium bromide, disilyl bismethylcyclopentadienyl titanium dimethyl, disilyl bismethylcyclopentadienyl titanium diethyl, disilyl bismethylcyclopentadienyl titanium diphenyl, tetramethylsilyl biscyclopentadienyl titanium chloride, tetramethylsilyl biscyclopentadienyl titanium bromide, tetramethylsilyl biscyclopentadienyl titanium dimethyl, tetramethylsilyl biscyclopentadienyl titanium diethyl, tetramethylsilyl biscyclopentadienyl titanium diphenyl, tetramethylsilyl bismethylcyclopentadienyl titanium chloride, tetramethylsilyl bismethylcyclopentadienyl titanium bromide, tetramethylsilyl bismethylcyclopentadienyl titanium dimethyl, tetramethylsilyl bismethylcyclopentadienyl titanium diethyl, tetramethylsilyl bismethylcyclopentadienyl titanium diphenyl, silyl biscyclopentadienyl zirconium chloride, silyl biscyclopentadienyl zirconium bromide, silyl biscyclopentadienyl zirconium dimethyl, silyl biscyclopentadienyl zirconium diethyl, silyl biscyclopentadienyl zirconium diphenyl, silyl bismethylcyclopentadienyl zirconium chloride, silyl bismethylcyclopentadienyl zirconium bromide, silyl bismethylcyclopentadienyl zirconium dimethyl, silyl bismethylcyclopentadienyl zirconium diethyl, silyl bismethylcyclopentadienyl zirconium diphenyl, dimethylsilyl biscyclopentadienyl zirconium chloride, dimethylsilyl biscyclopentadienyl zirconium bromide, dimethylsilyl biscyclopentadienyl zirconium dimethyl, dimethylsilyl biscyclopentadienyl zirconium diethyl, dimethylsilyl biscyclopentadienyl zirconium diphenyl, dimethylsilyl biscyclopentadienyl zirconium chloride, dimethylsilyl biscyclopentadienyl zirconium bromide, dimethylsilyl bismethylcyclopentadienyl zirconium dimethyl, dimethylsilyl bismethylcyclopentadienyl zirconium diethyl, dimethylsilyl bismethylcyclopentadienyl zirconium diphenyl, dimethylsilyl bismethylcyclopentadienyl zirconium chloride, phenylmethylsilyl biscyclopentadienyl zirconium bromide, phenylmethylsilyl biscyclopentadienyl zirconium dimethyl, phenylmethylsilyl biscyclopentadienyl zirconium diethyl, phenylmethylsilyl biscyclopentadienyl zirconium diphenyl, phenyldimethylsilyl bismethylcyclopentadienyl zirconium chloride, phenylmethylsilyl bismethylcyclopentadienyl zirconium bromide, phenylmethylsilyl bismethylcyclopentadienyl zirconium dimethyl, phenylmethylsilyl bismethylcyclopentadienyl zirconium diethyl, phenylmethylsilyl bismethylcyclopentadienyl zirconium diphenyl, diphenylsilyl biscyclopentadienyl zirconium dichloride, diphenylsilyl biscyclopentadienyl zirconium bromide, diphenylsilyl biscyclopentadienyl zirconium dimethyl, diphenylsilyl biscyclopentadienyl zirconium diethyl, diphenylsilyl biscyclopentadienyl zirconium diphenyl, diphenylsilyl bismethylcyclopentadienyl zirconium chloride, diphenylsilyl bismethylcyclopentadienyl zirconium bromide, diphenylsilyl bismethylcyclopentadienyl zirconium dimethyl, diphenylsilyl bismethylcyclopentadienyl zirconium diethyl, diphenylsilyl bismethylcyclopentadienyl zirconium diphenyl, disilyl biscyclopentadienyl zirconium chloride, disilyl biscyclopentadienyl zirconium bromide, disilyl biscyclopentadienyl zirconium dimethyl, disilyl biscyclopentadienyl zirconium diethyl, disilyl biscyclopentadienyl zirconium diphenyl, disilyl bismethylcyclopentadienyl zirconium chloride, disilyl bismethylcyclopentadienyl zirconium bromide, disilyl bismethylcyclopentadienyl zirconium dimethyl, disilyl bismethylcyclopentadienyl zirconium diethyl, disilyl bismethylcyclopentadienyl zirconium diphenyl, tetramethylsilyl biscyclopentadienyl zirconium chloride, tetramethylsilyl biscyclopentadienyl zirconium bromide, tetramethylsilyl biscyclopentadienyl zirconium dimethyl, tetramethylsilyl biscyclopentadienyl zirconium diethyl, tetramethylsilyl biscyclopentadienyl zirconium diphenyl, tetramethylsilyl bismethylcyclopentadienyl zirconium chloride, tetramethylsilyl bismethylcyclopentadienyl zirconium bromide, tetramethylsilyl bismethylcyclopentadienyl zirconium dimethyl, tetramethylsilyl bismethylcyclopentadienyl zirconium diethyl, tetramethylsilyl bismethylcyclopentadienyl zirconium diphenyl, silyl biscyclopentadienyl hafnium chloride, silyl biscyclopentadienyl hafnium bromide, silyl biscyclopentadienyl hafnium dimethyl, silyl biscyclopentadienyl hafnium diethyl, silyl biscyclopentadienyl hafnium diphenyl, silyl bismethylcyclopentadienyl hafnium chloride, silyl bismethylcyclopentadienyl hafnium bromide, silyl bismethylcyclopentadienyl hafnium dimethyl, silyl bismethylcyclopentadienyl hafnium diethyl, silyl bismethylcyclopentadienyl hafnium diphenyl, dimethylsilyl biscyclopentadienyl hafnium chloride, dimethylsilyl biscyclopentadienyl hafnium bromide, dimethylsilyl biscyclopentadienyl hafnium dimethyl, dimethylsilyl biscyclopentadienyl hafnium diethyl, dimethylsilyl biscyclopentadienyl hafnium diphenyl, dimethylsilyl biscyclopentadienyl hafnium chloride, dimethylsilyl bismethylcyclopentadienyl hafnium bromide, dimethylsilyl bismethylcyclopentadienyl hafnium dimethyl, dimethylsilyl bismethylcyclopentadienyl hafnium diethyl, dimethylsilyl bismethylcyclopentadienyl hafnium diphenyl, dimethylsilyl bismethylcyclopentadienyl hafnium chloride, phenylmethylsilyl biscyclopentadienyl hafnium bromide, phenylmethylsilyl biscyclopentadienyl hafnium dimethyl, phenylmethylsilyl biscyclopentadienyl hafnium diethyl, phenylmethylsilyl biscyclopentadienyl hafnium diphenyl, phenylmethylsilyl bismethylcyclopentadienyl hafnium chloride, phenylmethylsilyl bismethylcyclopentadienyl hafnium bromide, phenylmethylsilyl bismethylcyclopentadienyl hafnium dimethyl, phenylmethylsilyl bismethylcyclopentadienyl hafnium diethyl phenylmethylsilyl bismethylcyclopentadienyl hafnium diphenyl, diphenylsilyl biscyclopentadienyl hafnium dichloride, diphenylsilyl biscyclopentadienyl hafnium bromide, diphenylsilyl biscyclopentadienyl hafnium dimethyl, diphenylsilyl biscyclopentadienyl hafnium diethyl, diphenylsilyl biscyclopentadienyl hafnium diphenyl, diphenylsilyl bismethylcyclopentadienyl hafnium chloride, diphenylsilyl bismethylcyclopentadienyl hafnium bromide, diphenylsilyl bismethylcyclopentadienyl hafnium dimethyl, diphenylsilyl bismethylcyclopentadienyl hafnium diethyl, diphenylsilyl bismethylcyclopentadienyl hafnium diphenyl, disilyl biscyclopentadienyl hafnium chloride, disilyl biscyclopentadienyl hafnium bromide, disilyl biscyclopentadienyl hafnium dimethyl, disilyl biscyclopentadienyl hafnium diethyl, disilyl biscyclopentadienyl hafnium diphenyl, disilyl bismethylcyclopentadienyl hafnium chloride, disilyl bismethylcyclopentadienyl hafnium bromide, disilyl bismethylcyclopentadienyl hafnium dimethyl, disilyl bismethylcyclopentadienyl hafnium diethyl, disilyl bismethylcyclopentadienyl hafnium diphenyl, tetramethylsilyl biscyclopentadienyl hafnium chloride, tetramethylsilyl biscyclopentadienyl hafnium bromide, tetramethylsilyl biscyclopentadienyl hafnium dimethyl, tetramethylsilyl biscyclopentadienyl hafnium diethyl, tetramethylsilyl biscyclopentadienyl hafnium diphenyl, tetramethylsilyl bismethylcyclopentadienyl hafnium chloride, tetramethylsilyl bismethylcyclopentadienyl hafnium bromide, tetramethylsilyl bismethylcyclopentadienyl hafnium dimethyl tetramethylsilyl bismethylcyclopentadienyl hafnium diethyl, tetramethylsilyl bismethylcyclopentadienyl hafnium diphenyl, and the like. Such compounds can be used alone or as a mixture thereof.

The compound containing carbon-fluorine bond as the other essential constituent of the olefin polymerizing catalyst component according to the invention is a compound containing carbon-fluorine bond in the molecule thereof. More specifically, it is an organic compound with one, two or all hydrogen atoms thereof substituted by fluorine atoms. For example, it is a carbon-fluorine bond-containing compound represented by the general formula $R^2-R^3_q$ or $R^2(A-R^3)_q$ where q is $1 \leq q \leq 4$, preferably $1 \leq q \leq 3$, A is a group selected from —O—, —OSiR$^4_2$—, —C(OR$^5$)$_2$— and —C(OR$^5$)$_2$O—, $R^2$ is a fluoride atom-containing halocarbon group of $C_1$ to $C_{30}$, $R^3$ and $R^4$ are each a hydrogen atom, a halogen atom or a hydrocarbon residue of $C_1$ to $C_{30}$, $R^5$ is a hydrocarbon residue of $C_1$ to $C_{30}$, provided when $R^3$, $R^4$ and $R^5$ are each contained in a plural number, they may be the same or different, and $R^2$ and $R^3$ may conjointly form a ring.

The halocarbon group as referred to herein indicates a hydrocarbon group with some or all of hydrogen atoms in the molecules thereof substituted by halogen atoms such as fluorine, chlorine, bromine or iodine atoms. The hydrocarbon group is a monovalent hydrocarbon group having usually 1 to 30, preferably 1 to 20, more preferably 1 to 12, carbon atoms, or a multivalent hydrocarbon group having 2 to 4 free valences. Examples are monovalent hydrocarbon groups such as, alkyl groups, e.g. methyl, ethyl, propyl, isopropyl, cyclopropyl, butyl, isobutyl, tert-butyl, cyclobutyl, pentyl, isopentyl, neopentyl, cyclopentyl, hexyl, isohexyl, cyclohexyl, heptyl and octyl, alkenyl groups, e.g. vinyl and allyl, aryl groups, e.g. phenyl, tolyl, xylyl, mesityl, indenyl and naphthyl, and aralkyl groups, e.g. benzyl, trityl, phenethyl, styryl, benzhydryl, trityl, phenylbutyl and phenylpropyl; divalent hydrocarbon groups such as alkylene groups, e.g. methylene, ethylene, propylene and butylene, arylene and arylalkylene; trivalent hydrocarbon groups such as alkanetriyl, arenetriyl and arylalkanetriyl; and tetravalent hydrocarbon groups such as alkanetetrayl, arenetetrayl and arylalkanetetrayl. Of course, these hydrocarbon groups may have branches, or some methylene groups in the molecular chain may be substituted with hetero-atoms such as oxygen atoms.

The fluorine atom-containing halocarbon group as $R^2$ in the foregoing formula has as the halogen moiety a fluorine atom alone or both fluorine atom and any other halogen atom which is chlorine, bromine or iodine. The number of fluorine atom as a substituent is not specially limited. One, two or more, or all of hydrogen atoms may be substituted with fluorine atoms. Also as to its substitutional position and steric configuration, there is no special limitation and they may be selected arbitrarily.

In connection with the fluorine atom-containing halocarbon group, i.e. $R^2$, as examples of monovalent ones are mentioned such alkyl groups as fluoromethyl, fluoroethyl, fluoropropyl, fluoroisopropyl, fluorocyclopropyl, fluorobutyl, fluoroisobutyl, fluoro-tert-butyl, fluorocyclobutyl, fluoropentyl, fluoroisopentyl, fluoroneopentyl, fluorocyclopentyl, fluorohexyl, fluoroisohexyl, fluorocyclohexyl, fluoroheptyl, and fluorooctyl, as well as fluorophenyl, fluorobenzyl, fluoromesityl, fluoroindenyl, fluoronaphthyl, trifluoroethyl, hexafluoroisopropyl, pentafluoropropyl, perfluorobutylethyl, perfluoroethyl, perfluorodecylethyl, perfluoroethylhexyl, perfluorobutylhexyl, perfluorohexylhexyl, perfluorooctylhexyl, perfluoroisoamylethyl, perfluoroisononylethyl, perfluoroisopropylhexyl, perfluoroisoamylhexyl, perfluoroisoheptylhexyl, perfluoroisononylhexyl, tetrafluoropropyl, octafluoropentyl, dodecafluoroheptyl, hexadecafluorononyl, bis(trifluoromethyl)propyl, hexafluorobutyl, perfluorohexyliodopropyl, perfluorooctyliodopropyl, perfluoroisoheptyliodopropyl, perfluoroisononyliodopropyl, octafluoropropyl, perfluorobutyl, octafluorocyclobtyl, perfluoropentyl, perfluorocyclopentyl, perfluorohexyl, perfluorocyclohexyl, perfluoroheptyl, perfluorocycloheptyl, perfluorooctyl, perfluorocyclooctyl, perfluorononyl, perfluorocyclononyl, perfluorodecyl, perfluorocyclodecyl, perfluoroundecyl, perfluorocycloundecyl, perfluorododecyl, perfluorocyclododecyl, perfluorotridecyl, perfluorocyclotridecyl, perfluorotetradecyl, perfluorocyclotetradecyl, perfluoropentadecyl, perfluorocyclopentadecyl, perfluorohexadecyl, perfluorocyclohexadecyl, perfluoroheptadecyl, perfluorocycloheptadecyl, perfluorooctadecyl, perfluorocyclooctadecyl, perfluorononadecyl, perfluorocyclononadecyl, perfluorononaeicosyl, perfluorocycloeicosyl, perfluorophenyl, perfluorobenzyl, perfluoroxylyl, perfluoromesitylenyl, perfluorocumyl, perfluoronaphthyl, perfluorodecalyl, fluorodichloromethyl, 1,1-dichloro-1-fluoroethyl, 1-bromo-2-fluoroethyl, 1,1-difluoroethyl, bromotetrafluoropropyl, iodooctafluorobutyl, pentafluorophenyl, bromotetrafluorophenyl, chlorotetrafluorophenyl, iodotetrafluorophenyl, tetrafluorophenyl, chlorotrifluorophenyl, dichlorotrifluorophenyl, bromotrifluorophenyl, dibromotrifluorophenyl, trifluorophenyl, chlorodifluorophenyl, dichlorodifluorophenyl, trichlorofluorophenyl, bromodifluorophenyl, dibromodifluorophenyl, tribromodifluorophenyl, difluorophenyl, chlorofluorophenyl, dichlorofluorophenyl, trichlorofluorophenyl, tetrachlorofluorophenyl, bromofluorophenyl, dibromofluorophenyl, tribromofluorophenyl, tetrabromofluorophenyl, trifluorophenyl, hexafluoroxylyl, trifluoromethylnaphthyl, di-(trifluoromethyl)-naphthyl, trifluoromethyldecalyl and di-(trifluoromethyl)-decalyl.

Also employable are di- to tetravalent hydrocarbon groups having the same carbon skeleton as that of the monovalent hydrocarbon groups referred to above as examples of the fluorine-containing halocarbon group and in which one to three hydrogen atoms in each molecule have become free valences.

Substitutional positions of the fluorine atoms in the fluorine-containing halocarbon groups exemplified above are selected quite arbitrarily and any positions may be used.

As examples of the halogen atom in $R^3$, $R^4$ and $R^5$ there are mentioned fluorine, chlorine, bromine and iodine. The hydrocarbon residue as referred to herein indicates a hydrocarbon group or a substituted hydrocarbon group wherein one or more of hydrogen atoms have been substituted with any functional groups. As examples of such functional groups are mentioned those represented by the general formula -OR where R denotes the foregoing hydrocarbon or halocarbon group of $C_1$ to $C_{20}$, as well as halogen atoms such as fluorine, chlorine, bromine and iodine. As a hydrocarbon group serving as a basic skeleton of the hydrocarbon residue referred to herein there is mentioned one having usually 1 to 30, preferably 1 to 20, more preferably 1 to 12, carbon atoms.

Examples of such hydrocarbon group include alkyl groups such as methyl, ethyl, propyl, isopropyl, cyclopropyl, butyl, isobutyl, tert-butyl, cyclobutyl, pentyl, isopentyl, neopentyl, cyclopentyl, hexyl, isohexyl, cyclohexyl, heptyl and octyl, alkenyl groups such as vinyl and allyl, aryl groups such as phenyl, mesityl, tolyl, xylyl, indenyl and naphthyl, aralkyl groups such as benzyl, trityl, phenethyl, styryl, benzhydryl, phenylbutyl and phenylpropyl, alkylene groups such as methylene, ethylene, propylene, isopropylene, cyclopropylene, butylene, isobutylene, tert-butylene, cyclobutylene, pentylene, isopentylene, neopentylene, cyclopentylene, hexylene, isohexylene, cyclohexylene, heptylene and octylene, arylene groups such as phenylene, mesitylene, tolylene, xylylene, indenylene and naphthylene, and aralkylene groups such as benzylene, tritylene, phenethylene and styrylene.

The following compounds are mentioned as more concrete examples of the carbon-fluorine bond-containing compound [constituent (2)]:

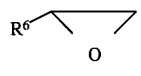 (general formula A)

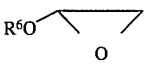 (general formula B)

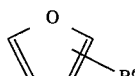 (general formula C)

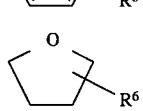 (general formula D)

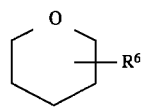 (general formula E)

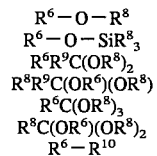

| | |
|---|---|
| $R^6-O-R^8$ | (general formula II) |
| $R^6-O-SiR^8{}_3$ | (general formula III) |
| $R^6R^9C(OR^8)_2$ | (general formula IV) |
| $R^8R^9C(OR^6)(OR^8)$ | (general formula V) |
| $R^6C(OR^8)_3$ | (general formula VI) |
| $R^8C(OR^6)(OR^8)_2$ | (general formula VII) |
| $R^6-R^{10}$ | (general formula VIII) |

In the above formulae, $R^6$ represents a fluorine atom-containing halocarbon group having 1 to 30, preferably 1 to 20, more preferably 1 to 12, carbon atoms. The halocarbon group as referred to herein indicates a hydrocarbon group with some or all of hydrogen atoms in the molecule thereof have been substituted by halogen atoms such as fluorine, chlorine, bromine or iodine atoms. As examples of such hydrocarbon group there are mentioned alkyl groups such as methyl, ethyl, propyl, isopropyl, cyclopropyl, butyl, isobutyl, tert-butyl, cyclobutyl, pentyl, isopentyl, neopentyl, cyclopentyl, hexyl, isohexyl, cyclohexyl, heptyl and octyl, alkenyl groups such as vinyl and allyl, aryl groups such as phenyl, tolyl, xylyl, mesityl, indenyl and naphthyl, and aralkyl groups such as benzyl, trityl, phenethyl, styryl, benzhydryl, trityl, phenylbutyl and phenylpropyl. Of course, these hydrocarbon groups may have branches.

The fluorine atom-containing halocarbon group as $R^6$ in the above formulae has as the halogen moiety a fluorine atom alone or both fluorine atom and any other halogen atom which is chlorine, bromine or iodine. The number of fluorine atom as a substituent is not specially limited. One, two or more, or all of hydrogen atoms may be substituted with fluorine atoms. Also as to its substitutional position and steric configuration, there is no special limitation and they may be selected arbitrarily.

As examples of such fluorine atom-containing halocarbon group, i.e. $R^6$, there are mentioned alkyl groups such as fluoromethyl, fluoroethyl, fluoropropyl, fluoroisopropyl, fluorocyclopropyl, fluorobutyl, fluoroisobutyl, fluoro-tert-butyl, fluorocyclobutyl, fluoropentyl, fluoroisopentyl, fluoroneopentyl, fluorocyclopentyl, fluorohexyl, fluoroisohexyl, fluorocyclohexyl, fluoroheptyl, and fluorooctyl, as well as fluorophenyl, fluorobenzyl, fluoromesityl, fluoroindenyl, fluoronaphthyl, trifluoroethyl, hexafluoroisopropyl, pentafluoropropyl, perfluorobutylethyl, perfluoroethyl, perfluorodecylethyl, perfluoroethylhexyl, perfluorobutylhexyl, perfluorohexylhexyl, perfluorooctylhexyl, perfluoroisoamylethyl, perfluoroisononylethyl, perfluoroisopropylhexyl, perfluoroisoamylhexyl, perfluoroisoheptylhexyl, perfluoroisononylhexyl, tetrafluoropropyl, octafluoropentyl, dodecafluoroheptyl, hexadecafluorononyl, bis(trifluoromethyl)propyl, hexafluorobutyl, perfluorohexyliodopropyl, perfluorooctyliodopropyl, perfluoroisoheptyliodopropyl, perfluoroisononyliodopropyl, octafluoropropyl, perfluorobutyl, octafluorocyclobtyl, perfluoropentyl, perfluorocyclopentyl, perfluorohexyl, perfluorocyclohexyl, perfluoroheptyl, perfluorocycloheptyl, perfluorooctyl, perfluorocyclooctyl, perfluorononyl, perfluorocyclononyl, perfluorodecyl, perfluorocyclodecyl, perfluoroundecyl, perfluorocycloundecyl, perfluorododecyl, perfluorocyclododecyl, perfluorotridecyl, perfluorocyclotridecyl, perfluorotetradecyl, perfluorocyclotetradecyl, perfluoropentadecyl, perfluorocyclopentadecyl, perfluorohexadecyl, perfluorocyclohexadecyl, perfluoroheptadecyl, perfluorocycloheptadecyl, perfluorooctadecyl, perfluorocyclooctadecyl, perfluorononadecyl, perfluorocyclononadecyl, perfluorononaeicosyl, perfluorocycloeicosyl, perfluorophenyl, perfluorobenzyl, perfluoroxylyl, perfluoromesitylenyl, perfluorocumyl, perfluoronaphthyl, perfluorodecalyl, fluorodichloromethyl, 1,1-dichloro-1-fluoroethyl, 1-bromo-2-fluoroethyl, 1,1-difluoroethyl, bromotetrafluoropropyl, iodooctafluorobutyl, pentafluorophenyl, bromotetrafluorophenyl, chlorotetrafluorophenyl, iodotetrafluorophenyl, tetrafluorophenyl, chlorotrifluorophenyl, dichlorotrifluorophenyl, bromotrifluorophenyl, dibromotrifluorophenyl, trifluorophenyl, chlorodifluorophenyl, dichlorodifluorophenyl, trichlorofluorophenyl, bromodifluorophenyl, dibromodifluorophenyl, tribromodifluorophenyl, difluorophenyl, chlorofluorophenyl, dichlorofluorophenyl, trichlorofluorophenyl, tetrachlorofluorophenyl, bromofluorophenyl, dibromofluorophenyl, tribromofluorophenyl, tetrabromofluorophenyl, trifluorophenyl, hexafluoroxylyl, trifluoromethylnaphthyl, di-(trifluoromethyl)-naphthyl, trifluoromethyldecalyl and di-(trifluoromethyl)-decalyl.

In the foregoing formulae, $R^8$ has the same meaning as $R^6$ or represents a hydrocarbon group having 1 to 30, preferably 1 to 20, more preferably 1 to 12, carbon atoms. In the case where plural $R^8$s are included in one molecule, they may be the same or different.

As examples of such hydrocarbon group are mentioned alkyl groups such as methyl, ethyl, propyl, isopropyl, cyclopropyl, butyl, isobutyl, tert-butyl, cyclobutyl, pentyl, isopentyl, neopentyl, cyclopentyl, hexyl, isohexyl, cyclohexyl, heptyl and octyl, alkenyl groups such as vinyl and allyl, aryl groups such as phenyl, tolyl, xylyl, mesityl, indenyl and naphthyl, and aralkyl groups such as benzyl, trityl, phenethyl, styryl, benzhydryl, trityl, phenylbutyl and phenylpropyl. These hydrocarbon groups may have branches.

$R^9$ in the foregoing formulae has the same meaning as $R^8$ or represents a hydrogen atom, and $R^{10}$ is a hydrogen atom or a halogen atom such as fluorine, chlorine, bromine or iodine.

As examples of compounds represented by the general formula A there are mentioned 3-perfluorohexyl-1,2-epoxypropane, 3-perfluorooctyl-1,2-epoxypropane, 3-perfluorodecyl-1,2-epoxypropane, 3-(perfluoro-3-methylbutyl)-1,2-epoxypropane, 3-(perfluoro-5-methylhexyl)-1,2-epoxypropane, 3-(perfluoro-7-methyloctyl)-1,2-epoxypropane and 3-(perfluoro-9-methyldecyl)-1,2-epoxypropane.

As examples of compounds represented by the general formula B there are mentioned 3-(2,2,3,3-tetrafluoropropoxy)-1,2-epoxypropane, 3-(1H,1H,5H-octafluoropentyloxy)-1,2-epoxypropane, 3-(1H,1H,7H-dodecafluoroheptyloxy)-1,2-epoxypropane, and 3-(1H,1H,9H-hexadecafluorononyloxy)-1,2-epoxypropane.

As examples of compounds represented by the general formula C there are mentioned 2-trifluoromethylfuran, 2-(1,1,1-trifluoroethyl)furan and 2-(trifluoromethyl-1,1,1-trifluoroethyl)furan.

As examples of compounds represented by the general formula D there are mentioned 2-trifluoromethyltetrahydrofuran, 2-(1,1,1-trifluoroethyl)tetrahydrofuran and 2-(trifluoromethyl-1,1,1-trifluoroethyl)tetrahydrofuran.

As examples of compounds represented by the general formula E there are mentioned 2-trifluoromethyltetrahydropyran, 2-(1,1,1-trifluoroethyl)tetrahydropyran and 2-(trifluoromethyl-1,1,1-trifluoroethyl)tetrahydropyran.

As examples of compounds represented by the general formula II there are mentioned ether compounds containing at least one fluorine atom.

More concrete examples are 2,2,3,3,3-pentafluoropropylmethyl ether, 2,2,3,3,3-pentafluoropropyl-1,1,2,2-tetrafluoroethyl ether, 1,1,2,2-tetrafluoroethylmethyl ether, 1,1,2-trifluoro-2-chloroethyl-2,2,2-trifluoroethyl ether, 1,1,3,3,3-pentafluoro-2-trifluoromethylpropyl ether, 2,2,2-trifluoroethyl ether, 2,2,2-trifluoroethylethyl ether, 2,2,2-trifluoroethybutyl ether, 2,2,2-trifluoroethybenzyl ether, 2,2,2-trifluoroethytrityl ether, 2,2,3,3-pentafluoropropyltrityl ether, 6-(perfluoroethyl)-hexyltrityl ether, 1H,1H-hexafluoroethybutyltrityl ether, 2-(perfluorobutyl) ethyltrityl ether, 6-(perfluorobutyl)hexyltrityl ether, 2-perfluorohexylethyltrityl ether, and 2-perfluorooctylethyltrityl ether.

As examples of compounds represented by the general formula III there are mentioned silyl ether compounds containing at least one fluorine atom. More concrete examples are 2,2,2-trifluoroethyltrimethylsilyl ether, 2,2,3,3-pentafluoropropyltrimethylsilyl ether, 6-(perfluoroethyl)-hexyltrimethylsilyl ether, 1H,1H-hexafluoroethybutyltrimethylsilyl ether, 2-(perfluorobutyl)ethyltrimethylsilyl ether, 6-(perfluorobutyl)hexyltrimethylsilyl ether, 2-perfluorohexylethyltrimethylsilyl ether, 2-perfluorooctylethyltrimethylsilyl ether, 2,2,2-trifluoroethyltriphenylsilyl ether, 2,2,3,3-pentafluoropropyltriphenylsilyl ether, 6-(perfluoroethyl)-hexyltriphenylsilyl ether, 1H,1H-hexafluorobutyltriphenylsilyl ether, 2-(perfluorobutyl)ethyltriphenyllsilyl ether, 6-(perfluorobutyl)hexyltriphenylsilyl ether, 2-perfluorohexylethyltriphenylsilyl ether, and 2-perfluorooctylethyltriphenylsilyl ether.

As examples of compounds represented by the general formula IV there are mentioned acetal and ketal compounds containing at least one fluorine atom in a carbon skelton derived from ketone or aldehyde. More concrete examples are 2,2-dimethoxy-1,1,1-trifluoropropane, 2,2-diethoxy-1,1,1-trifluoropropane, 2,2-dimethoxy-1,1,1,3,3,3-hexafluoropropane, 2,2-diethoxy-1,1,1,3,3,3-hexafluoropropane, 1,1-dimethoxy-1-pentafluorophenylethane, 1,1-diethoxy-1-pentafluorophenylethane, dimethoxypentafluorophenylmethane and diethoxydipentafluorophenylmethane.

As examples of compounds represented by the general formula V there are mentioned acetal and ketal compounds containing at least one fluorine atom in a carbon skelton derived from alcohol. More concrete examples are 2,2-bis(2,2,2-trifluoroethoxy)-propane, 1,1-bis(2,2,2-trifluoroethoxy)-cyclohexane, 1,1-bis(2,2,2-trifluoroethoxy)- 1-phenylethane, di(2,2,2-trifluoroethoxy)diphenylmethane and di(2,2,2-trifluoroethoxy)phenylmethane, As examples of compounds represented by the general formula VI there are mentioned orthoester compounds containing at least one fluorine atom in a carbon skeleton derived from carboxylic acid. More concrete examples are 1,1,1-trimethoxy-2,2,2-trifluoroethane and 1,1,1-triethoxy-2,2,2-trifluoroethane.

As examples of compounds represented by the general formula VII there are mentioned orthoester compounds containing at least one fluorine atom in a carbon skeleton derived from alcohol. A more concrete example is 1,1,1-tri(2,2,2-trifluoroethoxy)-ethane.

As examples of compounds represented by the general formula VIII there are mentioned halocarbons containing at least one fluorine or hydrocarbons containing at least one fluorine atom. More concrete examples are perfluorohexane, perfluoroheptane, perfluoromethylcyclohexane, perfluorooctane, 1-bromoheptadecafluorooctane, perfluorododecane, perfluoro-2,7-dimethyloctane, perfluoro-2,11-dimethyldodecane, tribromofluoromethane, dibromofluoromethane, 1-bromo-2-fluoromethane, 1,2-dibromo-1,1-difluoroethane, 1,1,1-trichlorotrifluoroethane, 1,1,1,3-tetrachlorotetrafluoropropane, 1,2-dibromohexafluoropropane, 1,1,3,4-tetrachlorohexafluorobutane, 1,1,3,5,6-hexachlorooctafluorohexane, 1,1,3,5,6-pentachlorononafluorohexane, hexafluorobenzene, chloropentafluorobenzene, bromopentafluorobenzene, pentafluorobenzene, dichlorotetrafluorobenzene, dibromotetrafluorobenzene, tetrafluorobenzene, trichlorotrifluorobenzene, tribromotrifluorobenzene, trifluorobenzene, tetrachlorodifluorobenzene, tetrabromodifluorobenzene, difluorobenzene, fluorobenzene, perfluorotoluene, perfluoromethylcyclohexane, trifluoromethylbenzene, benzyl fluoride, bistrifluoromethylbenzene, octafluoronaphthalene, perfluorodecalin and perfluorobiphenyl.

Of the foregoing general formulae, general formula II and III are preferred, and among the compounds exemplified above, particularly preferred are 3-perfluorohexyl-1,2-epoxypropane, 2-trifluoromethylfuran, 2-trifluoromethyltetrahydrofuran, 2-trifluoromethyltetrahydropyran, 2,2,2-trifluoroethylbenzyl ether, 2,2,2-trifluoroethyltrityl ether, 2,2,3,3-pentafluoropropyltrityl ether, 1H,1H-hexafluorobutyltrityl ether, 2,2,2-trifluoroethyltriphenylsilyl ether, 2,2,3,3-pentafluoropropyltriphenylsilyl ether, 1H,1H-hexafluorobutyltriphenylsilyl ether, 2,2-dimethoxy-1,1,1-trifluoropropane, 2,2-diethoxy-1,1,1-trifluoropropane, 2,2-dimethoxy-1,1,1,3,3,3-hexafluoropropane, 2,2-diethoxy-1,1,1,3,3,3-hexafluoropropane, 2,2-bis(2,2,2-trifluoroethoxy)propane, 1,1-bis(2,2,2-trifluoroethoxy)-cyclohexane, 1,1,1-trimethoxy-2,2,2-trifluoroethane, 1,1,1-triethoxy-2,2,2-trifluoroethane, 1,1,1-tri(2,2,2-trifluoroethoxy)-ethane, hexafluorobenzene, perfluorotoluene, and bistrifluoromethylbenzene.

Of course, these compounds may be used in combination of two or more.

The modified organoaluminum compound used in the present invention is the reaction product of an organoaluminum compound and water and contains 1 to 100, preferably 1 to 50, Al—O—Al bonds in the molecule thereof. The reaction of an organoaluminum and water is carried out usually in an inert hydrocarbon. As the inert hydrocarbon there may be used any of aliphatic, alicyclic and aromatic hydrocarbons such as pentane, hexane, heptane, cyclohexane, methylcyclohexane, benzene, toluene and xylene, with aliphatic and aromatic hydrocarbons being preferred.

The organoaluminum compound referred to above is usually a compound represented by the general formula $R_nAlX_{3-n}$ where R is a hydrocarbon group such as an alkyl, alkenyl, aryl or aralkyl group having 1 to 18, preferably 1 to 12, carbon atoms, X is a hydrogen atom or a halogen atom, and n is an integer satisfying the condition of $1 \leq n \leq 3$. Preferably, a trialkylaluminum is used. The alkyl group in the trialkylaluminum may be any of methyl, ethyl, propyl, isopropyl, butyl, isobutyl, pentyl, hexyl, octyl, decyl and dodecyl, with methyl being particularly preferred.

The reaction ratio (water/Al mol ratio) of water to the organoaluminum compound is preferably in the range from 0.25/1 to 1.2/1, more preferably 0.5/1 to 1/1. The reaction temperature is usually in the range from $-70°$ C. to $100°$ C., preferably $-20°$ C. to $20°$ C., and a suitable reaction time is selected usually in the range from 5 minutes to 24 hours, preferably 10 minutes to 5 hours. As the water required for the reaction there may be used not only the so-called water but also water of crystallization contained in copper sulfate hydrates, aluminum sulfate hydrate, etc.

The olefin polymerizing catalyst component according to the present invention is obtained by contacting its essential constituents with each which constituents, as mentioned previously, are (1) a compound [constituent (1)] represented by the general formula $R_pMX_{4-p}$ and (2) a compound [constituent (2)] containing a carbon-fluorine bond. By further contacting the resulting contact reaction product with (3) a modified organoaluminum compound [constituent (3)] obtained by the reaction of an organoaluminum compound and water and containing Al—O—Al bond. As to in what order these constituents should be contacted, there is no special limitation. For example, there may be adopted a method wherein the catalyst constituents are contacted outside the polymerization system by any of the following methods and the resulting catalyst is introduced into the polymerization system:

A. Adding (1), (2) and (3) at a time.
B. Contacting (1) and (2) into constituent (4), followed by adding (3).
C. Contacting (1) and (3) into constituent (5), followed by adding (2).
D. Contacting (2) and (3) into constituent (6), followed by adding (1).
E Contacting (4) and (5).
F Contacting (4) and (6).
G Contacting (5) and (6).
H Further adding (1) to method A.
I Further adding (2) to method A.
J Further adding (3) to method A.
K Further adding (1) to method B.
L Further adding (2) to method B.
M Further adding (3) to method B.
N Further adding (1) to method C.
O Further adding (2) to method C.
P Further adding (3) to method C.
Q Further adding (1) to method D.
R Further adding (2) to method D.
S Further adding (3) to method D.

These catalyst constituents may be added directly into the polymerization system, for example in any of the following orders:

a. (1)→(2)→(3)
b. (1)→(3)→(2)
c. (2)→(1)→(3)
d. (2)→(3)→(1)
e. (3)→(1)→(2)
f. (3)→(2)→(1)

Or, constituents (4), (5) and (6) may be prepared outside the polymerization system and then added into the polymerization system in any of the following orders:

g. (4)→(3)
h. (3)→(4)
i. (5)→(2)
j. (2)→(5)
k. (6)→(1)
l. (1)→(6)

Or, there may be adopted a method wherein constituents (1), (2) and (3) are contacted into constituent (7) by any of the above methods A to S, followed by addition into the polymerization system in any of the following orders:

m. (7)→(3)
n. (3)→(7)
o. (7)→(2)
p. (2)→(7)

q. (7)→(1)

r. (1)→(7)

Above all, the procedure of first contacting constituents (1) and (3), followed by contact with constituent (2), is preferred.

Also regarding how to contact the three constituents, there may be adopted any suitable method. According to a method adopted usually, the constituents (1), (2) and (3) are contacted in an inert atmosphere such as a nitrogen or argon atmosphere in the presence of an inert hydrocarbon solvent such as heptane, hexane, benzene, toluene or xylene, at a temperature usually in the range from −100° C. to 200° C., preferably −50° C. to 100° C., for 30 minutes to 50 hours, preferably 2 to 24 hours.

In the case where the constituents are contacted in an inert hydrocarbon solvent, the resulting catalyst may be used in the polymerization in the state of solution directly after completion of all the contact reactions. Alternatively and if possible, the catalyst may be once withdrawn as a solid catalyst through precipitation, drying, or any other suitable means and thereafter used in the polymerization. Of course, each contact reaction may be performed by a plural number of times.

As to the proportions of the three constituents, it is desirable that, per mol of constituent (1), the proportion of constituent (2) be in the range of 0.01 to 100 mols, more preferably 0.1 to 10 mols, still more preferably 0.5 to 2 mols, and that of constituent (3), 1 to 1,000 mols, more preferably 1 to 100 mols, still more preferably 1 to 50 mols.

According to the present invention, olefins are homopolymerized or copolymerized in the presence of a catalyst comprising the catalyst component thus prepared and the modified organoaluminum compound described above. In this case, one or both may be supported on an inorganic carrier typified by magnesium compounds, alumina, silica and silica-alumina and/or a particulate polymer carrier. In any case, suitable proportions of the catalyst component and the modified organoaluminum compound are selected in such a manner that an atomic ratio of aluminum contained in the modified organoaluminum compound to the transition metal in the catalyst component is in the range of 1 to 100,000, preferably 5 to 1,000.

In the olefins referred to herein there are included α-olefins, cyclic olefins, dienes, trienes and styrene analogs. Examples of α-olefins include those having 2 to 12, preferably 2 to 8, carbon atoms. More concrete examples are ethylene, propylene, butene-1, hexene-1 and 4-methylpentene-1. An α-olefin can be homopolymerized using the catalyst component of the invention and it is also possible to copolymerize two or more kinds of α-olefins using such catalyst component. The copolymerization may be any of alternating copolymerization, random copolymerization and block copolymerization.

In the copolymerization of α-olefins there are included the case where ethylene and an α-olefin having 3 to 12, preferably 3 to 8, carbon atoms are copolymerized, such as ethylene/propylene, ethylene/butene-1, ethylene/hexene-1 and ethylene/4-methylpentene-1 and the case where propylene and an α-olefin having 3 to 12, preferably 3 to 8, carbon atoms, such as propylene/butene-1, propylene/4-methylpentene-1, propylene/4-methylbutene-1, propylene/hexene-1 and propylene/octene-1. In the case of copolymerizing ethylene or propylene with another α-olefin, the amount of such α-olefin may be selected optionally on condition that it does not exceed 90 mol% of the total monomer quantity. Generally, however, in the case of an ethylene copolymer, the amount of such another α-olefin is not larger than 40 mol%, preferably not larger than 30 mol%, more preferably not larger than 20 mol%, while in the case of a propylene copolymer, the amount of such another α-olefin is selected in the range of 1–90 mol%, preferably 5–90 mol%, more preferably 10–70 mol%.

Examples of cyclic olefins employable in the invention are those having 3 to 24, preferably 3 to 18, carbon atoms, including cyclopentene, cyclobutene, cyclohexene, 3-methylcyclohexene, cyclooctene, cyclodecene, tetracyclodecene, octacyclodecene, dicyclopentadiene, norbornene, 5-methyl-2-norbornene, 5-ethyl-2-norbornene, 5-isobutyl-2-norbornene, 5,6-dimethyl-2-norbornene, 5,5,6-trimethyl-2-norbornene, and ethylidene norbornene. Usually, a cyclic olefin is copolymerized with the foregoing α-olefin and in this case the amount of the cyclic olefin is not larger than 50 mol%, usually in the range of 1–50 mol%, preferably 2–50 mol%, relative to the copolymer.

Dienes and trienes employable in the present invention are chain polyenes which can be represented by the following general formula:

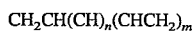

$$CH_2CH(CH)_n(CHCH_2)_m$$

where m is 1 or 2 and n is 0 to 20, preferably 2 to 20. Examples are butadiene, 1,4-hexadiene, 1,5-hexadiene, 1,9-decadiene, 1,13-tetradecadiene, 2,6-dimethyl-1,5-heptadiene, 2-methyl-2,7-octadiene, 2,7-dimethyl-2,6-octadiene, and 1,5,9-decatriene. In the case of using a chain diene or triene in the present invention, it is usually copolymerized with the foregoing α-olefin, and the content of chain diene and/or triene in the copolymer is usually in the range of 0.1 to 50 mol%, preferably 0.2 to 10 mol%.

Styrene analogs employable in the present invention are styrene and styrene derivatives. As examples of such derivatives there are mentioned t-butylstyrene, α-methylstyrene, p-methylstyrene, divinylbenzene, 1,1-diphenylethylene, N,N-dimethyl-p-aminoethylstyrene and N,N-diethyl-p-aminoethylstyrene.

The catalyst component of the present invention is also suitable for use in further polymerizing a homopolymer or a copolymer of olefin(s) with a polar monomer for the purpose of modification of the homopolymer or copolymer. As examples of such polar monomer there are mentioned unsaturated carboxylic acid esters such as methyl acrylate, methyl methacrylate, butyl methacrylate, dimethyl maleate, diethyl maleate, monomethyl maleate, diethyl fumarate, and dimethyl itaconate. The polar monomer content of the copolymer thus modified is usually in the range of 0.1 to 10 mol%, preferably 0.2 to 2 mol%.

The polymerization reaction may be carried out in the form of slurry polymerization, solution polymerization or vapor-phase polymerization in the presence of the catalyst component and promotor component described above. Particularly, a slurry polymerization or a vapor-phase polymerization is preferred. Olefin(s) is polymerized in a substantially oxygen- and water-free condition and in the presence or absence of an inert hydrocarbon solvent selected from aliphatic hydrocarbons such as hexane and heptane, aromatic hydrocarbons such as benzene and toluene and xylene and alicyclic hydrocarbons such as cyclohexane and methylcyclohexane. Conditions for the polymerization involve a temperature in the range of 20° to 200° C., preferably 50° to 100° C., a pressure in the range from atmospheric pressure to 70 kg/cm$^2$G preferably from atmospheric pressure to 20 kg/cm$^2$G, and a polymerization time in the range from 5 minutes to 10 hours, preferably 5 minutes to 5 hours.

The molecular weight of the polymer to be prepared can be adjusted to some extent by changing polymerization conditions such as polymerization temperature and catalyst mole ratio, but the addition of hydrogen to the polymerization reaction system is more effective for this purpose.

The process of the present invention is also applicable to a multi-stage polymerization of two or more stages involving different polymerization conditions such as different hydrogen concentrations, different monomer quantities and different polymerization temperatures and pressures.

EXAMPLES

The following examples are given to illustrate the present invention more concretely, but it is to be understood that the invention is not limited thereto.

The following methods were adopted to determine physical properties of the polymers obtained in the following working and comparative examples.

Melt Flow Rate (MFR)

Determined at 190° C. under a load of 2.16 kg according to ASTM D 1238-57T.

Density

Determined according to ASTM D 1505-68.

Determination of Melting Point using Differential Scanning Calorimeter (DSC)

Using a melting point measuring device Model DSC-20 (a product of Seiko Denshi K.K.), a polymer sample (5 mg) is held at 180° C. for 3 minutes, then cooled to 0° C. at a rate of 10° C./min, and after holding the sample at 0° C. for 10 minutes, the temperature is raised at a rate of 10° C./min, to determine the melting point.

Mw/Mn

Determined using a Type 150C GPC device (a product of Waters Co.), a column of GMH-6 (a product of Toyo Soda Manufacturing Co.), a solvent of o-dichlorobenzene, and under the conditions of temperature 135° C., flow rate 1.0 ml/min.

Preparation of Modified Organoaluminum Compound

Modified organoaluminum compound (methylaluminoxane: MAO) used in the following working and comparative examples was prepared in the following manner.

13 g of copper sulfate pentahydrate was placed in a three-necked flask having an internal volume of 300 ml and equipped with an electromagnetic induction stirrer and was suspended in 50 ml of toluene. Then, 150 ml of a solution containing 1 mmol/ml of trimethylaluminum was added dropwise into the resulting suspension at 0° C. over a 2 hour period. Thereafter, the temperature was raised to 25° C. and reaction was allowed to take place at that temperature for 24 hours. Subsequently, the reaction solution was filtered to remove toluene from the solution containing the reaction product, thereby affording 4 g of methylaluminoxane as white crystals.

Example 1

A solution of methylaluminoxane in toluene (0.5 mmol/ml) was added to $2.2 \times 10^{-5}$ mol of a biscyclopentadienylzirconium dichloride solution in toluene (Al Zr=50) and stirring was conducted at room temperature. To the resulting solution was added $2.2 \times 10^{-5}$ mol of a hexafluorobenzene solution in toluene and stirring was performed at room temperature to afford a catalyst solution having a Zr concentration of $4.4 \times 10^{-3}$ mmol/ml.

200 g of sea sand which had been washed and heat-treated was fed into a 2-liter autoclave and dried thoroughly. Then, 5 ml of the catalyst solution prepared above was charged into the autoclave, into which was further introduced a gaseous mixture of ethylene and 1-butene [butene/ethylene= 0.2 (mol ratio)] up to a pressure of 9 kg/cm$^2$G. Polymerization was carried out at 60° C. for 2 hours while maintaining the said pressure. Catalytic efficiency was 62 kg/g. Zr, density was 0.9352 g/cm$^3$, MFR 1.0 g/10 min melting point 108.9° C., Mw/Mn=16.3.

Example 2

The procedure of Example 1 was repeated except that the hexafluorobenzene was substituted by trifluoroethyltrityl ether. Catalytic efficiency was 64 kg/g. Zr, density was 0.9226 g/cm$^3$, MFR 1.1 g/10 min, melting point 106.2° C., Mw/Mn =13.3.

Example 3

The procedure of Example 1 was repeated except that the hexafluorobenzene was substituted by trifluoroethyltriphenylsilyl ether. Catalytic efficiency was 63 kg/g. Zr, density was 0.9300 g/cm$^3$, MFR 1.0 g/10 min, melting point 107.2° C., Mw/Mn=15.0.

Example 4

The procedure of Example 1 was repeated except that the hexafluorobenzene was substituted by chloropentafluorobenzene. Catalytic efficiency was 55 kg/g. Zr, density was 0.9215 g/cm$^3$, MFR 0.92 g/10 min, melting point 105.5° C., Mw/Mn=12.9.

Example 5

The procedure of Example 1 was repeated except that the hexafluorobenzene was substituted by 3-perfluorohexyl-1, 2-epoxypropane. Catalytic efficiency was 57 kg/g. Zr, density was 0.9222 g/cm$^3$, MFR 1.4 g/10 min, melting point 106.2° C., Mw/Mn=15.5.

Example 6

The procedure of Example 1 was repeated except that the hexafluorobenzene was substituted by perfluoromethylcyclohexane. Catalytic efficiency was 55 kg/g. Zr density was 0.9340 g/cm$^3$, MFR 1.0 g/10 min, melting point 107.9° C., Mw/Mn=13.7.

Example 7

The procedure of Example 1 was repeated except that the hexafluorobenzene was substituted by perfluoroheptane. Catalytic efficiency was 55 kg/g. Zr, density was 0.9345 g/cm$^3$, MFR 1.0 g/10 min, melting point 108.0° C., Mw/Mn=16.5

Example 8

The procedure of Example 1 was repeated except that the hexafluorobenzene was substituted by trifluoromethyltriethoxymethane. Catalytic efficiency was 58 kg/g. Zr, density was 0.9236 g/cm$^3$, MFR 1.4 g/10 min, melting point 107.0° C., Mw/Mn=13.4.

Example 9

The procedure of Example 1 was repeated except that the hexafluorobenzene was substituted by 2,2-bismethoxyhexafluoropropane- Catalytic efficiency was 58 kg/g. Zr, density was 0.9216 g/cm$^3$, MFR 0.90 g/10 min, melting point 105.8° C., Mw/Mn=12.4.

Example 10

The procedure of Example 1 was repeated except that the hexafluorobenzene was substituted by bis(trifluoroethoxy)propane. Catalytic efficiency was 80 kg/g. Zr, density was 0.9342 g/cm$^3$, MFR 1.7 g/10 min, melting point 107.8° C., Mw/Mn=13.7.

Example 11

The procedure of Example 1 was repeated except that the hexafluorobenzene was substituted by tris(trifluoroethoxy)ethane- Catalytic efficiency was 75 kg/g. Zr, density was 0.9347 g/cm$^3$, MFR 1.4 g/10 min, melting point 108.1° C., Mw/Mn=16.5.

Example 12

The procedure of Example 1 was repeated except that 2.2×10$^{-5}$ mol of a biscyclopentadienylzirconium dimethyl solution in toluene was used in place of the biscyclopentadienylzirconium dichloride solution in toluene. Catalytic efficiency was 60 kg/g. Zr, density was 0.9348 g/cm$^3$, MFR 1.0 g/10 min, melting point 108.9° C., Mw/Mn=16.3.

Example 13

The procedure of Example 1 was repeated except that 2.2×10$^{-5}$ mol of a ethylenebisindenylzirconium dichloride solution in toluene was used in place of the biscyclopentadienylzirconium dichloride solution in toluene. Catalytic efficiency was 70 kg/g. Zr, density was 0.9200 g/cm$^3$, MFR 0.45 g/10 min, melting point 105.1° C., Mw/Mn=14.3.

Example 14

The procedure of Example 1 was repeated except that 2.2×10$^{-5}$ mol of a biscyclopentadienyldimethoxyzirconium solution in toluene was used in place of the biscyclopentadienylzirconium dichloride solution in toluene. Catalytic efficiency was 55 kg/g. Zr, density was 0.9248 g/cm$^3$, MFR 1.7 g/10 min, melting point 106.0° C., Mw/Mn=11.2.

Example 15

A solution of methylaluminoxane in toluene (0.5 mmol/ml) was added to 2.2×10$^{-5}$ mol of a biscyclopentadienyltitanium dichloride solution in toluene (Al/Ti=500) and stirring was conducted at room temperature. To the resulting solution was added 2.2×10$^{-5}$ mol of a chloropentafluorobenzene solution in toluene and stirring was performed at room temperature to prepare a catalyst solution having a Ti concentration of 8.8×10$^{-4}$ mmol/ml.

200 g of sea sand which had been washed and heat-treated was fed into a 2-liter autoclave and dried thoroughly. Then, 25 ml of the catalyst solution prepared above was introduced into the autoclave, into which was further introduced a gaseous mixture of ethylene and 1-butene up to a pressure of 9 kg/cm$^2$G. While maintaining this pressure, polymerization was carried out at 60° C. for 2 hours. Catalytic efficiency was 15 kg/g. Ti, density was 0.9225 g/cm$^3$, MFR 2.5 g/10 min, melting point 107.2° C., Mw/Mn=15.0.

Example 16

The procedure of Example 13 was repeated except that 2.2×10$^{-5}$ mol of biscyclopentadienylhafnium dichloride and methylaluminoxane were used in place of the biscyclopentadienyltitanium dichloride. Catalytic efficiency was 8 kg/g.Hf, density was 0.9325 g/cm$^3$, MFR 7.0 g/10 rain, melting point 108.3° C., Mw/Mn=16.3.

Example 17

The procedure of Example 1 was repeated except that pentafluorobenzyltrityl ether was used in place of the hexafluorobenzene. Catalytic efficiency was 90 kg/g. Zr, density was 0.9200 g/cm$^3$, MFR 0.92 g/10 min, melting point 106.5° C., Mw/Mn=12.9.

Example 18

A methylaluminoxane solution in toluene (0.5 mmol/ml) was added to 2.2×10$^{-5}$ mol of a cyclopentadienyltitanium trichloride solution in toluene (Al/Ti=500) and stirring was conducted at room temperature. To this solution was added 2.2×10$^{-5}$ mol of a hexafluorobenzene solution in toluene and stirring was performed at room temperature to prepare a catalyst solution having a Zr concentration of 8.8×10$^{-4}$ mmol/ml.

200 g of sea sand which had been washed and heat-treated was fed into a 2-liter autoclave and dried thoroughly. Then, 25 ml of the catalyst solution prepared above was introduced into the autoclave, into which was further introduced ethylene gas up to a pressure of 9 kg/cm$^2$. While maintaining this pressure, polymerization was carried out at 60° C. for 2 hours. Catalytic efficiency was 10 kg/g.Ti, density was 0.9610 g/cm$^3$, MFR 0.30 g/10 rain melting point 129.3° C., Mw/Mn=15.0.

Comparative Example 1

The procedure of Example 1 was repeated except that the hexafluorobenzene was not used. Catalytic efficiency was 40 kg/g. Zr, density was 0.9198 g/cm$^3$, MFR 23 g/10 min, melting point 106.7° C., Mw/Mn=2.0.

Comparative Example 2

The procedure of Example 13 was repeated except that the chloropentafluorobenzene was not used. Catalytic efficiency was 10 kg/g.Ti, density was 0.9200 g/cm$^3$, MFR 4.5 g/10 min, melting point 107.0° C., Mw/Mn=3.7.

Comparative Example 3

The procedure of Example 14 was repeated except that the chloropentafluorobenzene was not used. Catalytic efficiency was 5 kg/g.Hf, density was 0.9180 g/cm$^3$, MFR 0.51 g/10 rain, melting point 108.1° C., Mw/Mn=3.5.

Comparative Example 4

The procedure of Example 1 was repeated except that the methylaluminoxane was not used. Polymerization did not occur.

Comparative Example 5

The procedure of Example 16 was repeated except that the hexafluorobenzene was not used. Catalytic efficiency was 5 kg/g.Ti, density was 0.9600 g/cm$^3$, MFR 1.5 g/10 min, melting point 129.0° C., Mw/Mn=7.0.

What is claimed is:

1. A catalyst component for the polymerization of olefins, comprising:

(1) a compound represented by the general formula $R_pMX_{4-p}$ where M is a transition metal of Group IVa in the Periodic Table, R is a group selected from the group consisting of cyclopentadienyl, substituted cyclopentadienyl, indenyl, substituted indenyl, and an aralkyl group having 7 to 24 carbon atoms, provided R may be bonded together through at least one divalent group selected from the group consisting of alkylene groups having 2 to 8 carbon atoms and silylene groups, X is a halogen atom, a hydrogen atom or a hydrocarbon residue having 1 to 24 carbon atoms, and p is a number satisfying the condition of $1 \leq p \leq 4$; and (2) a compound containing carbon-fluorine bond, wherein the amount of component (2) is in the range of 0.01 to 100 moles per mole of component (1).

2. A catalyst component as set forth in claim 1, wherein the transition metal is titanium, zirconium or hafnium.

3. A catalyst component as set forth in claim 1, wherein the compound having carbon-fluorine bond is a compound represented the general formula $R^2-R^2_q$ or $R^2(A-R^3)_q$ where q is $1 \leq q \leq 4$, A is a group selected from —O—, —OSiR$^4_2$—, —C(OR$^5$)$_2$— and —C(OR$^5$)$_2$O—, $R^2$ is a fluorine atom-containing hydrocarbon group of $C_1$ to $C_{30}$, $R^3$ and $R^4$ are each a hydrogen atom or a hydrocarbon residue of $C_1$ to $C_{30}$, $R^5$ is a hydrocarbon residue of $C_1$ to $C_{30}$.

4. A catalyst for the polymerization of olefins, comprising the catalyst component recited in claim 1 and a modified organoaluminum compound prepared by the reaction of an organoaluminum compound and water, said modified organoaluminum compound containing Al—O—Al bond.

5. A catalyst for the polymerization of olefins as set forth in claim 4, wherein the modified organoaluminum compound contains 1 to 100 Al—O—Al bonds in the molecule thereof.

6. A catalyst for the polymerization of olefins as set forth in claim 5, wherein the reaction ratio of water to the organoaluminum compound is 0.25/1 to 1.2/1 in terms of water/Al mol ratio.

7. A catalyst for the polymerization of olefins as set forth in claim 5, wherein the organoaluminum compound is represented by the general formula $R_n AlX_{3-n}$ where R is a hydrocarbon group of $C_1$ to $C_{18}$, X is a hydrogen atom or a halogen atom and n is $1 \leq n \leq 3$.

8. A catalyst for the polymerization of olefins as set forth in claim 7, wherein the organoaluminum compound is a trialkylaluminum compound.

9. A process for preparing an olefin homo- or co-polymer which comprises polymerizing at least one olefin in the presence of the catalyst recited in claim 5.

10. A catalyst component as in claim 1, wherein the amount of component (2) is in the range of 0.1 to 10 mols per mole of component (1).

11. A catalyst for the polymerization of olefins, comprising:

(1) a compound represented by the general formula $R_p MX_{4-p}$ where M is a transition metal of Group IVa in the Periodic Table, R is a group selected from the group consisting of cyclopentadienyl, substituted cyclopendadienyl, indenyl, substituted indenyl, and an aralkyl group having 7 to 24 carbon atoms, provided R may be bonded together through at least one divalent group selected from the group consisting of alkylene groups having 2 to 8 carbon atoms and silylene groups, X is a halogen atom, a hydrogen atom or a hydrocarbon residue having 1 to 24 carbon atoms, and p is number satisfying the condition of $1 \leq p \leq 4$;

(2) a compound containing carbon-fluorine bond; and (3) a modified organoaluminum compound prepared by the reaction of an organoalumium compound and water, said modified organoaluminum compound containing Al—O—Al bond, wherein the amount of modified organoaluminum compound is in the range of 1 to 1,000 moles per mole of component (1).

12. A catalyst component as in claim 4, wherein the amount of the modified organoaluminum compound is in the range of 1 to 1,000 moles per mole of component (1).

13. A catalyst component as in claim 4, wherein the amount of modified organoaluminum compound is in the range of 1 to 50 moles per mole of component (1).

* * * * *